Jan. 5, 1960 J. MERCIER 2,919,718
PRESSURE ACCUMULATOR
Original Filed Dec. 23, 1952
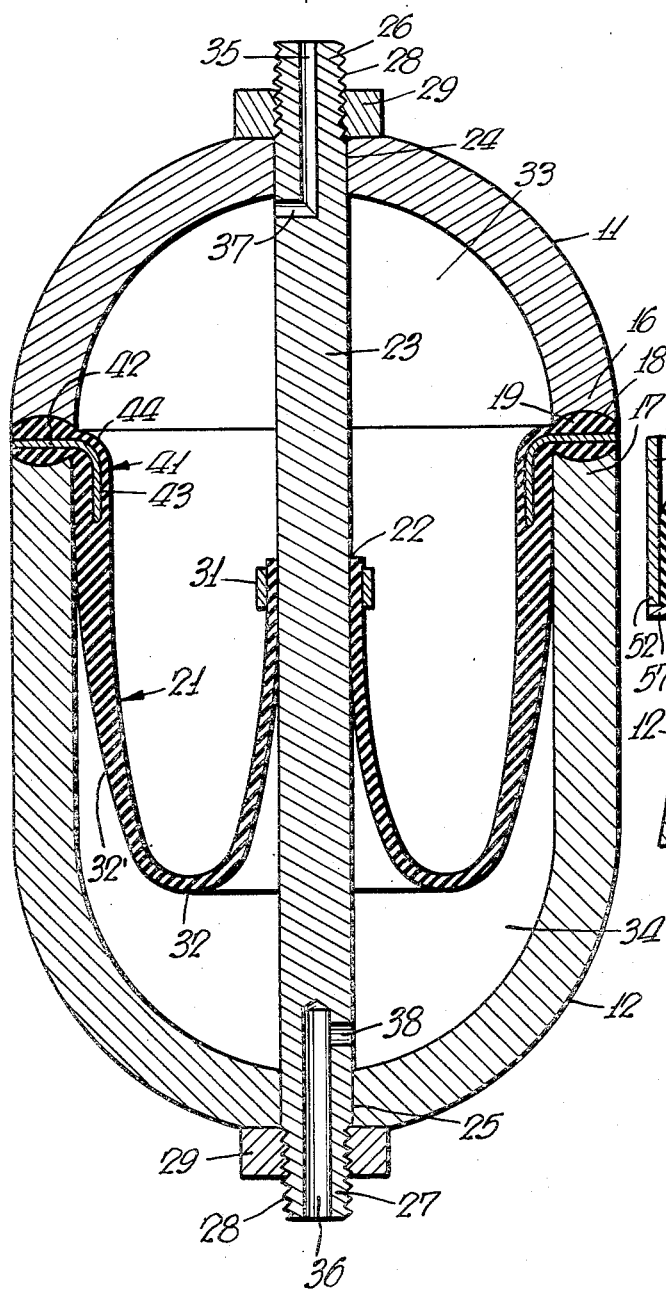
INVENTOR
Jean Mercier
BY
Dean Fairbank & Hirsch
ATTORNEYS

United States Patent Office 2,919,718
Patented Jan. 5, 1960

2,919,718

PRESSURE ACCUMULATOR

Jean Mercier, New York, N.Y.

Original application December 23, 1952, Serial No. 327,602, now Patent No. 2,773,511, dated December 11, 1956. Divided and this application May 3, 1956, Serial No. 582,535

5 Claims. (Cl. 138—30)

This invention relates to pressure accumulators, more particularly of the type formed by two juxtaposed shells with a deformable partition therebetween.

It is among the objects of the invention to provide a pressure accumulator of the above type that has but few parts which may readily be fabricated from low cost materials and which may readily be assembled with the use of but few simple tools securely to retain the periphery of the deformable partition therebetween in fixed position without use of any special clamping means other than those required to hold the accumulator shells together and in which the portion of the deformable partition adjacent the rim thereof, which is clamped between the two shells, will have substantially no sharp bending stress or strain imposed thereon which might cause weakening of the partition at such region with resultant tearing of the partition, regardless of the number of times the partition is expanded and contracted due to charging and discharging of the accumulator with continuous use.

According to the invention these objects are accomplished by the arrangement and combination of elements hereinafter described and particularly recited in the claims.

This application is a division of co-pending application Serial No. 327,602, filed December 23, 1952, now Patent No. 2,773,511, dated December 11, 1956.

In the accompanying drawings in which are shown one or more of various possible embodiments of the several features of the invention, Fig. 1 is a longitudinal sectional view of the accumulator, and Fig. 2 is a fragmentary longitudinal sectional view on a larger scale of another embodiment of the invention.

Referring to Fig. 1 of the drawings, the pressure accumulator desirably comprises a pair of cup-shaped, substantially cylindro-spherical shells 11 and 12 desirably having the same outer diameter, the shell 12 preferably being of greater length than the shell 11. Each of the rims 16, 17 of the shells 11 and 12 has an annular depression 18 therein between which the enlarged periphery or rim 19 of a deformable partition 21 may be positioned.

The partition 21 which desirably is of rubber, natural or synthetic, preferably is a circular disc of diameter considerably greater than the inner diameter of the shells 11 and 12 and has an axial opening 22 therethrough. The rims 16, 17 of the shells are desirably clamped against the enlarged periphery 19 of the partition 21 by means of a central rod 23 which extends longitudinally through the juxtaposed shells 11 and 12, through axial opening 22 in partition 21 and through axial openings 24 and 25 at the ends of the shells respectively. The protruding ends 26 nad 27 of the rod 23 are desirably threaded as at 28 so that they may receive a nut 29, which when screwed upon such threaded ends and tightened will move the shells 11 and 12 together so that the rims 16, 17 thereof will press tightly against the enlarged rim 19, securely retaining the latter in place and providing a dependable seal between such rim portions of the shell.

The periphery of opening 22 in partition 21 is securely retained against the central rod 23 as by means of a suitable clamp 31. The dimensions of the partition 21 and the position at which the periphery of opening 22 thereof is clamped to the rod 23 are so selected that as shown in Fig. 1, the partition will hang downwardly in shell 12 to define a bladder that is substantially conical in cross section, the distance of the outer surface 32' of the partition from the inner wall of the shell progressively increasing from the enlarged rim 19 thereof to the reversely bent bottom 32 thereof.

Means are desirably provided to charge the chamber 33 of the accumulator on one side of the partition 21 with gas, for example, and the chamber 34 on the other side of the partition 21 with a liquid such as oil. For this purpose each of the ends 26, 27 of the central rod 23 desirably has a longitudinal bore 35, 36 therein defining a gas and oil port respectively, and a transverse bore 37, 38 leads from such longitudinal bore into the accumulator. Thus, a gas under pressure may be forced through bores 35 and 37 into the accumulator chamber 33 on one side of the partition and a liquid such as oil may be forced through the bores 36 and 38 into the accumulator chamber 34 on the other side of the partition. As the valve means controlling the gas inlet port 35 and the oil port 36 are conventional they will not be shown.

In the operation of the accumulator shown in Fig. 1, gas under pressure is initially charged into the accumulator through port 35 and such port is thereupon sealed. Oil under pressure greater than that in the gas chamber 33 is forced through oil port 36 into liquid chamber 34. As the result, the partition 21 will be deformed and the gas in the chamber 33 will be compressed.

When the oil port 36 is opened in use of the accumulator the compressed gas in chamber 33 will cause the partition 21 to move outwardly thereby forcing oil through bores 38 and 36. As the partition 21 expands, the portion of the outer wall 32' thereof closest to the inner wall of shell 12 will first contact such shell and as more and more oil is forced from the accumulator, the wall of the partition will progressively engage such shell.

As a result, no oil pocket will be formed between the partition and the wall of the container and substantially all of the fluid in the container will be forced out therefrom. As the operation of the conical bladder above described is set forth in detail in Reissue Patent No. 23,437, dated December 4, 1951, it will not be further described.

The partition 21 is also desirably supported near the clamped rim thereof in such manner that regardless of the number of times the partition is expanded and contracted during charging and discharging of the accumulator, no sharp bending stress will be imparted to such clamped rim with the disadvantages previously pointed out. To this end, an annular supporting member 41 is desirably molded into the thickened rim 19 and adjacent wall portion of the partition 21. The supporting member 41 desirably is of resilient sheet material such as metal or suitable plastic and is substantially L-shaped in cross section. One leg 42 of the supporting member extends laterally into the thickened rim 19 and the other leg 43 extends downwardly into the wall portion of partition 21 adjacent rim 19. Desirably the junction between legs 42 and 43 is rounded as at 44 to eliminate a sharp edge.

In the embodiment shown in Fig. 2 which is identical in many respects to the embodiment of Fig. 1, parts corresponding to those in Fig. 1 will have the same reference numerals primed.

In this embodiment the rim 51 of shell 12' desirably has an outer diameter less than the inner diameter of the rim 52 of shell 11' so that it may readily fit therein. The enlarged rim 53 of partition 21' which is similar to partition 21 shown in Fig. 1, desirably has a reversely bent annular retaining member 54 associated therewith, said retaining member in cross section having an inner and outer leg 55 and 56 respectively extending substantially parallel to each other and an annular lip 57 extending laterally outward from the end of said outer leg 56. The inner leg 55 of said retaining member is molded into the rim of the partition in such manner that the inner surface of such inner leg 55 has a layer 58 of resilient material thereon which extends to the reversely bent edge 59 of said retaining member. The layer of resilient material also extends over the outer surface of said leg 55 as well as over the reversely bent edge 59 thereof and over the outer surface of outer leg 56 to the laterally projecting lip 57.

In assembling the accumulator, shown in Fig. 2, the rim 51 of shell 12' is positioned against the reversely bent edge 59 of retaining member 54 between the resilient material 58 of the partition and the inner surface of leg 56. The rim 52 of the shell 11' will seat on the laterally extending lip 57 with the inner surface of such shell against the resilient material on the outer surface of leg 56. Thus, when the two shells 12' and 11' are pressed together by the tightening of the nuts (not shown) at each end of the central rod 23' (similar to that shown in Fig. 1) the rims of the shells will be against a rigid metal support i.e., reversely bent edge 59 and lip 57 and the resilient material associated with the rims of the shells will provide a liquid and air tight seal which will prevent leakage from the accumulator. Desirably, the wall of shell 12' flares outwardly as shown and the wall of partition 21 defines a substantially cylindrical bladder, which construction will also cause progressive engagement of the partition with the shell to insure complete expulsion of oil from the accumulator and avoidance of any oil pockets therein.

It is of course to be understood that the shell 12' of Fig. 2 could be cylindrical and the partition 21' conical to provide progressive engagement of the partition with the associated shell.

With the construction above described, a simple yet highly efficient pressure accumulator is provided which is capable of continuous use for long periods of time without breakdown of the deformable partition therein.

By reason of supporting members 41 and 54, the adjacent portions of the associated partition will be restrained from any sharp bends regardless of the number of times the partition is expanded and contracted. Consequently, there is no likelihood of tearing of such bladder.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A pressure vessel comprising a plurality of members defining a container when in juxtaposition, said container having at least two adjacent rims, and the portions of said members at the ends of the container each having an opening axially aligned with said container, a flexible partition positioned in said container and having an axial opening therethrough, means on the outer periphery of said partition positioned between said adjacent rims, a rod extending through the axial opening in said partition and through the openings in the portion of said members at the ends of the container and protruding from the latter, means on the protruding ends of said rod to retain said adjacent rims in juxtaposition to clamp the outer periphery of the partition therebetween, a flexible supporting member affixed to said partition at the clamped periphery thereof to limit the bending of the portion of said partition adjacent said periphery, means securely to retain the periphery of the axial opening in said partition against said rod, and fluid ports leading into said pressure vessel to charge the latter.

2. The combination set forth in claim 1 in which the flexible supporting member is an annulus, substantially L-shaped in cross section forming a pair of legs, said supporting member being molded into said partition with one of the legs extending laterally into the periphery thereof and the other leg extending along the wall of said partition near the clamped portion thereof to retain the portion of said partition adjacent its periphery spaced from the rims when the partition is expanded and contracted during use of the accumulator, thereby limiting the bending of the portion of the partition adjacent its periphery.

3. A pressure accumulator comprising a pair of substantially cup-shaped shells each having an axial opening through the end thereof, the diameter of the rim of one of said shells being greater than the diameter of the rim of the other of said shells so that it may encompass the latter, a flexible partition having an axial opening therethrough, a reversely bent annular supporting member having an inner and outer leg extending substantially parallel to each other and an annular lip extending laterally outward from the end of said outer leg, the inner leg of said retaining member being embedded in the outer periphery of said partition, the resilient material of the latter on the inner side of said inner leg extending to the reversely bent edge thereof, said resilient material extending over the entire outer surface of said retaining member to the annular lip, the rim of the smaller diameter shell being positioned between the inner and outer legs and the rim of the larger diameter shell encompassing said legs and being seated on said annular lip, a rod extending through the axial opening in said partition and through the openings in said shell and protruding from the latter, means on the protruding ends of said rod to move the shells towards each other so that the rims thereof will be forced against the reversely bent edge of the retaining member and said annular lip, means securely to retain the periphery of the partition against said rod and a gas and liquid port leading into said accumulator for charging thereof.

4. As an article of manufacture, a flexible, extensible partition having a circular peripheral edge and an annular member of resilient sheet material having a portion thereof embedded in said partition adjacent the peripheral edge thereof.

5. As an article of manufacture a flexible partition of resilient material having a circular periphery, an annular supporting member of flexible material, reversely bent in cross section having an inner and outer leg extending substantially parallel to each other and an annular lip extending laterally outward from the end of said outer leg, the inner leg of said supporting member being embedded in the periphery of said partition, the resilient material of the latter on the inner side of said inner leg extending to the reversely bent edge thereof, said resilient material extending over the entire outer surface of said supporting member to the annular lip.

References Cited in the file of this patent

UNITED STATES PATENTS

| | | |
|---|---|---|
| 2,317,395 | Mercier | Apr. 27, 1943 |
| 2,365,063 | Downey | Dec. 12, 1944 |
| 2,371,632 | Lippincott | Mar. 20, 1945 |
| 2,394,401 | Overbeke | Feb. 5, 1946 |
| 2,478,575 | Fitch | Aug. 9, 1949 |

FOREIGN PATENTS

| | | |
|---|---|---|
| 345,957 | Germany | Dec. 22, 1921 |